United States Patent
Mohtadi et al.

(10) Patent No.: US 9,240,613 B2
(45) Date of Patent: *Jan. 19, 2016

(54) CARBORANYL MAGNESIUM ELECTROLYTE FOR MAGNESIUM BATTERY

(71) Applicant: Toyota Motor Engineering & Manufacturing North America, Inc., Erlanger, KY (US)

(72) Inventors: Rana Mohtadi, Northville, MI (US); Tyler J. Carter, Ann Arbor, MI (US); Timothy S. Arthur, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/902,797

(22) Filed: May 25, 2013

(65) Prior Publication Data

US 2014/0349199 A1    Nov. 27, 2014

(51) Int. Cl.
| | | |
|---|---|---|
| *H01M 10/058* | (2010.01) | |
| *H01M 10/0569* | (2010.01) | |
| *H01M 10/054* | (2010.01) | |
| *H01M 4/38* | (2006.01) | |
| *H01M 10/0568* | (2010.01) | |

(52) U.S. Cl.
CPC ............ *H01M 10/054* (2013.01); *H01M 4/381* (2013.01); *H01M 10/0568* (2013.01); *H01M 10/0569* (2013.01); *H01M 10/058* (2013.01); *Y10T 29/49108* (2015.01)

(58) Field of Classification Search
CPC .......... H01M 10/054; H01M 10/0569; H01M 10/058

See application file for complete search history.

(56) References Cited

U.S. PATENT DOCUMENTS 3,458,580 A    7/1969   Grafstein et al.

OTHER PUBLICATIONS

Amir et al, "Progress in nonaqueous magnesium electrochemistry", Journal of Power Sources 174 (2007) pp. 1234-1240.
Muldoon et al, "Electrolyte roadblocks to a magnesium rechargeable battery", Energy Environ. Sci., 2012, 5, pp. 5941-5950.
Korbe et al, "Chemistry of the Carba-closo-dodecaborate(-) Anion, CB11H12-", Chem. Rev. 2006, 106, 5208-5249.
Plesek et al, "Potential Applications of the Boron Cluster Compounds", Chem. Rev. 1992. 92. pp. 269-278.
Guo et al, "Boron-based electrolyte solutions with wide electrochemical windows for rechargeable magnesium batteries", Energy Environ. Sci., 2012, 5, pp. 9100-9106.
Aurbach et al, "Prototype systems for rechargeable magnesium batteries", Nature, vol. 407, Oct. 12, 2000 in 5 pages.

*Primary Examiner* — Ula C Ruddock
*Assistant Examiner* — Thomas Parsons
(74) *Attorney, Agent, or Firm* — Christopher G. Darrow; Darrow Mustafa PC

(57) ABSTRACT

An electrochemical device is provided having a carboranyl magnesium electrolyte. Specifically the disclosure relates to an electrochemical device having a carboranyl magnesium electrolyte which is compatible with a magnesium anode and a cathode, and on non-noble metal still having oxidative stability >3.0V vs. a magnesium reference.

20 Claims, 3 Drawing Sheets

CARBORANYL MAGNESIUM ELECTROLYTE FOR MAGNESIUM BATTERY

BACKGROUND

The present invention is, in general, directed to an electrochemical device having a carboranyl magnesium electrolyte, and in particular to an electrochemical device having a carboranyl magnesium electrolyte which is compatible with a magnesium anode and a cathode made of a non-noble metal while maintaining an oxidative stability >3.0V vs. a magnesium reference.

Due to the formation of an ion blocking layer at the electrode surface, most common salts of magnesium (Mg) cannot be used as effective magnesium battery electrolytes. It has been shown previously that Grignard reagents (R—Mg—X) support magnesium deposition and stripping (D. Aurbach, Z. Lu, A. Schechter, Y. Gofer, H. Gizbar, R. Turgeman, Y. Cohen, M. Moshkovich, E. Levi, *Nature* 2000, 407, 724; Ref (2) N. Amir, Y. Vestfrid, O. Chusid, Y. Gofer, D. Aurbach, *J. Power Sources* 2007, 174, 1234). Currently, typical electrolytes are based on a group of compounds known as organohaloaluminates which are obtained by the reaction of an alkyl Grignard or aryl Grignard with an aluminum based Lewis Acid ($AlX_3$) (J. Muldoon, C. B. Bucur, A. G. Oliver, T. Sugimoto, M. Matsui, H. S. Kim, Energy Environ. Sci. 2012, 5, 5941). Other non-haloaluminate electrolytes compatible with Mg metal with high reported stability are based on tris(3,5-dimethylphenyl)borane and phenyl Grignard (Yong-sheng Guo, Fan Zhang, Jun Yang, Fei-fei Wang, Yanna NuLi and Shin-ichi Hirano, DOI: 10.1039/c2ee22509c, Energy Environ. Sci., 2012).

The above compounds have been shown to effectively mediate reversible magnesium deposition and stripping with enhanced current density as compared to Grignard Reagents, but are incompatible with non-noble metal electrodes such as stainless steel, copper, and aluminum. For example, these compounds have been shown to be stable to >3.0 V (vs. magnesium reference) at a platinum surface but were found to have a much lower stability on stainless steel, i.e. <2.5 V (vs. magnesium reference) and <3.0 V on aluminum (vs. magnesium reference), due to their incompatibility with these metal surfaces at potentials >2.5 V (vs. magnesium reference). This prevents the use of non-noble metals as current collectors in contact of the high voltage cathodes thereby limiting the energy density of a theoretical magnesium battery. Additionally, a theoretical magnesium battery in which a noble metal is used would incur very high costs.

Accordingly, there exists a need for an improved electrolyte which would be compatible with non-noble metal electrodes.

SUMMARY

Disclosed, in various embodiments, are electrochemical devices having a carboranyl magnesium electrolyte and a process of forming these electrochemical devices.

In one embodiment, provided herein is an electrochemical device including an anode composed of magnesium or an alloy thereof; a cathode stable to a voltage of at least 3.0 V relative to a magnesium or reference electrode; and a carboranyl magnesium electrolyte of:

  formula (I)

  formula (II)

, or formula (III)

a combination of at least one of the foregoing, where i is an integer between 1 and 2 inclusive; j is an integer between 8 and 15 inclusive; p is an integer of j+1; X is a halide; and Y is an anion to provide charge neutrality. The carboranyl magnesium electrolyte as described can be employed alone or in combination with other electrolyte materials.

In yet another embodiment, provided herein is a process for preparing an electrochemical device that includes connecting an anode composed of magnesium or an alloy thereof, and a cathode via an external electrically conductive structure; and contacting the anode and cathode with a carboranyl magnesium electrolyte of:

  formula (I)

  formula (II)

, or formula (III)

a combination of at least one of the foregoing, where i is an integer between 1 and 2 inclusive; j is an integer between 8 and 15 inclusive; p is an integer of j+1; X is a halide; and Y is an anion to provide charge neutrality. These and other features of the electrochemical device having a carboranyl magnesium electrolyte, and the process for making the same, will become apparent from the following detailed description when read in conjunction with the figures and examples, which are exemplary, not limiting. The carboranyl magnesium electrolyte as described can be employed alone or in combination with other electrolyte materials.

BRIEF DESCRIPTION OF THE DRAWING

For a better understanding of the methods and devices having a carboranyl magnesium electrolyte, with regard to the embodiments thereof, reference is made to the accompanying examples and figures, in which.

DETAILED DESCRIPTION

Figure 1:
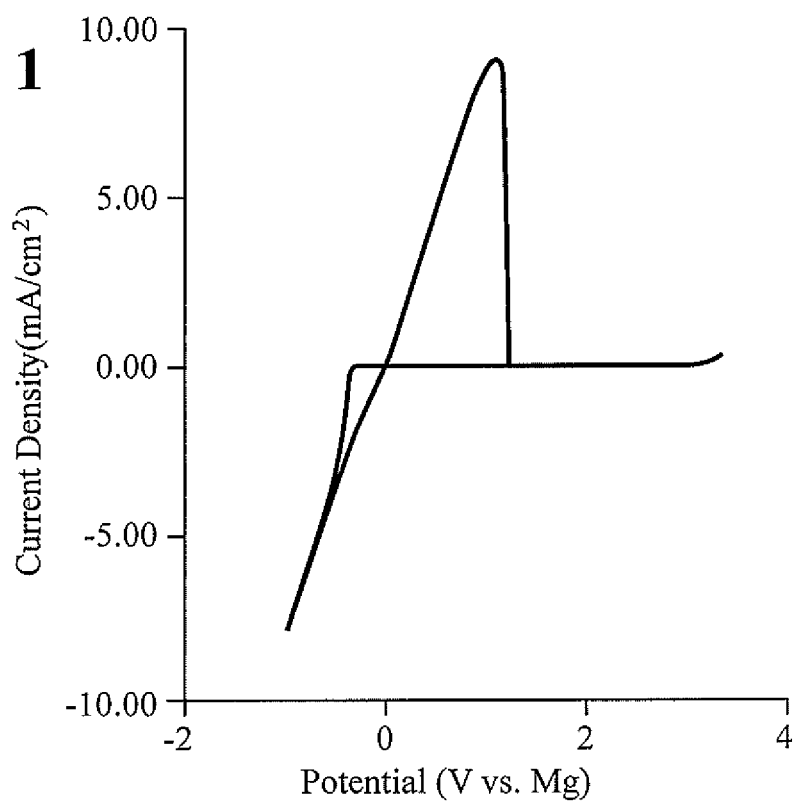
FIG. 1, illustrates the electrochemical performance of 1-(1,7-carboranyl)-magnesium-chloride (0.2 M in tetrahydrofuran (THF), Pt working electrode, 5 mV/s)

Provided herein are embodiments of an electrochemical device having a carboranyl magnesium electrolyte. The electrochemical device having a carboranyl magnesium electrolyte provided can be beneficial for use in magnesium batteries with electrodes made of non-noble metals such as stainless steel. The electrochemical device can be, for example, a battery cell, which generally comprises an anode current collector and a cathode current collector, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. In addition, anode or "negative electrode" refers to an electrode where electrochemical oxidation occurs during the discharging process. Likewise, cathode, or "positive electrode" refers to an electrode where electrochemical reduction occurs during the discharging process. In an embodiment, the anode, cathode, or both is/are made of non-noble metals, such as stainless steel, aluminum, magnesium, copper, or an alloy including at least one of the foregoing. In certain examples, "metal" refers to both metals and metalloids, including silicon and germanium and is intended to include Sn, Si, Al, Bi, Ge, and Pb and their alloys. Other examples for cathode include oxides, sulfides and sulfur.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Magnesium electrolytes based on halide free anions such as magnesium borohydride; and derivatives thereof, such as boron clusters, were reported by Mohtadi et al. (U.S. Provisional Application Ser. No. 61/678,672); incorporated herein by reference in its entirety. Magnesium borohydride electrolytes were reported as corrosion-free electrolytes, due to the absence of halides in the anion structure. As an addition to U.S. Provisional Ser. No. 61/678,672, provided herein are electrolytes based on carboranes. Like boron clusters ($B_{12}H_{12}^{-2}$), anionic carborane structures such as $CB_{11}H_{12}^{-1}$ and $C_2B_{10}H_{11}$ share the desired absence of halides, but have higher solubility in ethereal solvents. The application of organomagnesium compounds of carboranes have been previously limited to their use as intermediates in chemical synthesis. Disclosed herein, are the electrochemical properties discovered for these materials and their use as electrolytes for rechargeable magnesium batteries. Examples can be compounds such as $MgC_2B_{10}H_{11}X$ and $MgCB_{11}H_{12}X$, where X is a halide such as $Cl^{-1}$ and $Br^{-1}$, and halide free compounds such as $Mg(CB_{11}H_{12})_2$, $Mg(C_2B_{10}H_{11})_2$, $Mg(C_2B_{10}H_{11})(BH_4)$ and $Mg(CB_{11}H_{12})(BH_4)$.

These carboranyl magnesium compounds can be compatible with Mg metal and can exhibit high oxidative stability on both noble and non-noble metal electrodes. For example, $MgC_2B_{10}H_{11}Cl$ shows oxidative stability on stainless steel metal (e.g., 3.2 V vs. Mg reference), which to date, is higher than any other electrolyte compatible with Mg metal. Therefore, in an embodiment, by using the carboranyl magnesium compounds described herein, corrosion issues can be mitigated and electrochemical devices, such as Mg batteries, can be constructed at lower cost with more earth abundant metals, (e.g., aluminum, stainless steel). Moreover, the high solubility of these compounds in ethereal solvents can allow high current density with Coulombic efficiencies of about 96%.

Accordingly, and in an embodiment provided herein, is an electrochemical device, that includes a magnesium anode; a cathode; and a carboranyl magnesium electrolyte of at least one of the following:

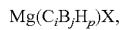 $Mg(C_iB_jH_p)X$, formula (I)

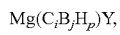 $Mg(C_iB_jH_p)Y$, formula (II)

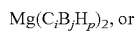 $Mg(C_iB_jH_p)_2$, or formula (III)

where i is an integer between 1 and 2 inclusive; j is an integer between 8 and 15 inclusive; p is an integer of j+1; X in formula (I) used in the electrochemical device having a carboranyl magnesium electrolyte described herein can be a halide, referring to, for example, chloride ($Cl^-$), bromide ($Br^-$), and iodide ($I^-$). Likewise, Y in formula (II) used in the electrochemical device having a carboranyl magnesium electrolyte described herein can be a monovalent anion. Non-limiting examples of suitable monovalent anions include alkoxides. In an embodiment, Y in formula II may be borohydride ($BH_4^-$). The carboranyl magnesium electrolyte as described can be employed alone or in combination with other electrolyte materials.

The carboranyl magnesium compounds used in the electrochemical device having a carboranyl magnesium electrolyte described herein are materials that are either soluble or partially soluble in ethereal solvents under normal operating conditions for the associated electrochemical cell. In certain embodiments, it is contemplated that the carboranyl magnesium electrolyte will have a solubility in THF of between 0.1 and 3 mmol/mL at 25° C. and atmospheric pressure.

The term "ether" or "ethereal" refers to compounds represented by the formula $A^1OA^2$, where $A^1$ and $A^2$ can be, independently, an optionally substituted $C_1$-$C_{12}$ alkyl, $C_5$-$C_8$ cycloalkyl, $C_3$-$C_{12}$ alkenyl, $C_5$-$C_8$ cycloalkenyl, $C_3$-$C_{12}$ alkynyl, $C_5$-$C_8$ cycloalkynyl, $C_5$-$C_8$ aryl, or $C_4$-$C_8$ heteroaryl group described herein where the carbon content so provided is exclusive of a substituent from one or more the carbon atoms or heteroatoms associated therewith. The heteroatom of an ethereal substituent or heteroaryl include, but are not limited to, nitrogen, oxygen, sulfur, and phosphorus. The ethereal solvent may be tetrahydrofuran, ethylene glycol dimethyl ether and bis 2-methoxy ethyl ether, or a combination comprising at least one of the foregoing, used in consideration of utility in a battery (e.g. safety and ease of handling). In certain embodiments, tetrahydrofuran may be advantageously employed, although battery construction and requirements may necessitate an ethereal solvent with different physical properties.

The carboranyl magnesium compounds used as electrolytes in the electrochemical devices and methods provided herein can be obtained by the reaction of m-carborane (1,7-$C_2B_{10}H_{12}$) with a Grignard reagent RMgX or $R_2$Mg, where R is an alkyl moiety, an aryl moiety or a combination thereof and X is as described above. The carboranyl magnesium compounds used as electrolytes in the electrochemical devices and methods provided herein can also be obtained by reacting n-butyl lithium followed by subsequent treatment with magnesium halide salt ($MgX_2$) at some molar ratio between 1:1 and 1:2 molar ratio. For example, dissolving 0.5 g of m-carborane 1,7-$C_2B_{10}H_{12}$ in 20 ml of tetrahydrofuran followed by the slow addition of 4.5 ml n-butyl lithium (present as 1.6 M in hexane) solution in a drop wise manner at −78° C. followed by the addition of a slurry containing 0.6 g $MgCl_2$ in tetrahydrofuran and refluxing for at least 24 hours provided a compound with formula 1,7-(1,7-$C_2B_{10}H_{10}$)—$Mg_2$—$Cl_2$. In addition, the carboranyl magnesium compounds represented by formula (II), used as electrolytes in the electrochemical devices and methods provided herein can be obtained, for example, by treating the corresponding carboranyl (in other words the respective desired magnesium carboranyl moieties) lithium with $Mg(BH_4)_2$, or alternatively/in addition, by reacting the stoichiometrically balanced $Mg(BH_4)_2$, directly with a carborane of formula $C_iB_jH_p$ (e.g. $C_2B_{10}H_{12}$). For example, dissolving 0.5 g of m-carborane 1,7-$C_2B_{10}H_{12}$ in 20 ml of tetrahydrofuran followed by the slow addition of 4.5 ml n-butyl lithium (present as 1.6 M in hexane) solution in a drop wise manner at −78° C. followed by the addition of 0.4 g $Mg(BH_4)_2$ in tetrahydrofuran and refluxing for at least 24 hours.

The term "aryl" as used herein, is a group that contains any carbon-based aromatic group including, but not limited to, benzyl, naphthyl, phenyl, biphenyl, phenoxybenzyl and the like. The term "aryl" also includes "heteroaryl," which is defined as a group that contains an aromatic substituent with at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, substituted alkyl, cycloalkyl, alkoxy, alkenyl, cycloalkenyl, alkynyl, cycloalkynyl, aryl, heteroaryl, aldehyde, amino, carboxyl, halide, hydroxyl, ketone, azido, nitro, silyl, sulfonyl, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

Likewise, the term "alkyl" is generally used to refer to both unsubstituted alkyl groups and substituted alkyl groups; however, substituted alkyl groups can also specifically be referred to herein by identifying the specific substituent(s) on the alkyl group. For example, the term "halogenated alkyl" specifically refers to an alkyl group that is substituted with one or more halide atoms such as, chloride, bromide, or iodide. The term "alkoxyalkyl" specifically refers to an alkyl group that is substituted with one or more alkoxy groups, as described below. The term "alkylamino" specifically refers to an alkyl group that is substituted with one or more amino groups, as described below. When "alkyl" is used in one instance and a specific term such as "hydroxyalkyl is used in another, it is not meant to imply that the term "alkyl" does not also refer to specific terms such as "hydroxyalkyl" and the like.

Figure 2:
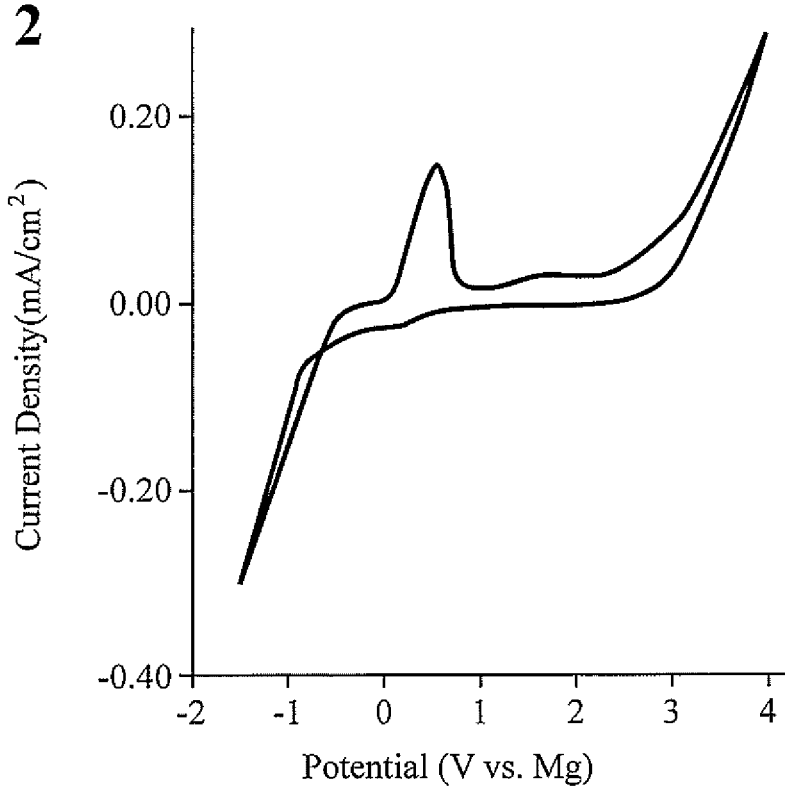
FIG. 2, illustrates the electrochemical performance of 1-(1,7-carboranyl)-dimagnesium-dichloride (0.05 M in THF, Pt working electrode, 5 mV/s)
Figure 3:
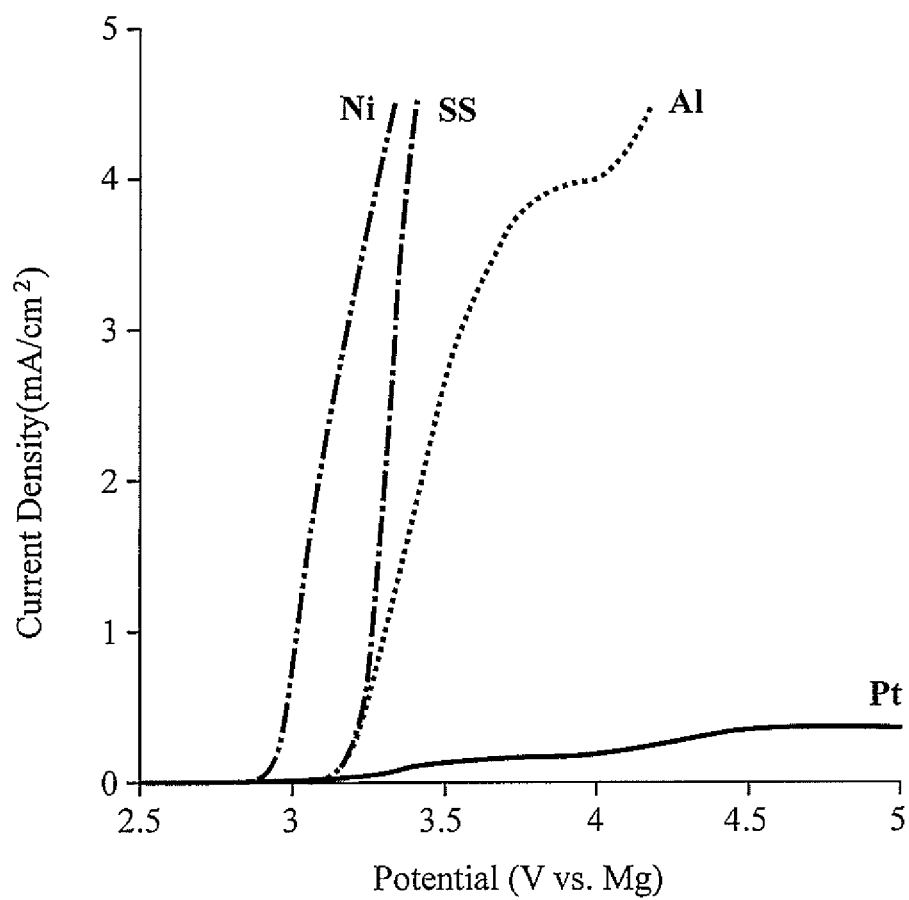
FIG. 3, illustrates linear scan voltammagrams showing oxidation onset of 1-(1,7-carboranyl)-magnesium-chloride on various working electrodes (0.2 M in THF, 5 mV/s)
Figure 4A:
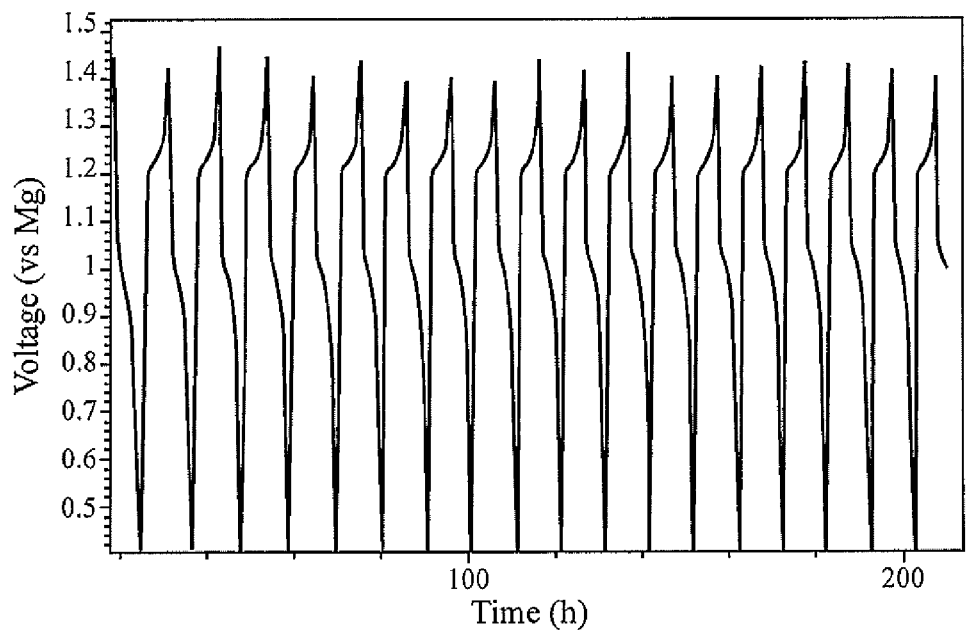
FIG. 4A illustrates a battery performance employing a magnesium metal, a molybdenum sulfide $Mo_6S_8$ cathode and a 1-(1,7-carboranyl)-magnesium-chloride electrolyte.
Figure 4B:
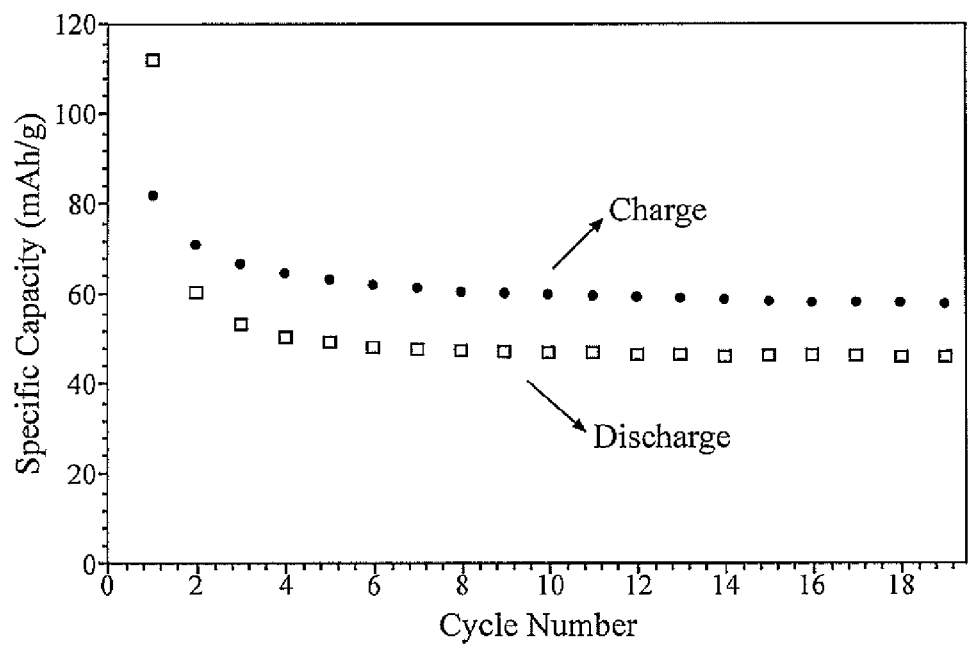
FIG. 4B demonstrates the stable battery charge/discharge cycling performance.

The carboranyl magnesium compounds used as electrolytes in the electrochemical devices and processes provided herein, when operated electrochemically, can exhibit high oxidative stability of over 3.0 V (vs. Mg reference). In an embodiment, $1\text{-}(1,7\text{-}C_2B_{10}H_{11})$—MgCl, and/or 1-(1,7-carboranyl) dimagnesium dichloride (see e.g., FIGS. 1 and 2) can be compatible with Mg metal with Coulombic efficiency ≥96% ("Coulombic efficiency", or "QE" or "ampere-hour efficiency" refer to the ratio, usually expressed as a percentage, of the ampere-hours removed from a battery during a discharge to the ampere-hours required to restore the initial capacity). Moreover, the carboranyl magnesium compounds used as electrolytes in the electrochemical devices and methods provided herein, can have a high oxidative stability on non-noble metal operating electrodes, for example, stainless steel and aluminum. In an embodiment, $1\text{-}(1,7\text{-}C_2B_{10}H_{11})$—MgCl, can exhibit high oxidative stability of over 3.3 V vs. a Mg reference when used with stainless steel electrode(s) (see e.g., FIG. 3).

In an embodiment, the carboranyl magnesium compounds used as electrolytes in the electrochemical devices are used in the processes described herein. Accordingly, provided herein is a process for preparing an electrochemical device, that includes connecting an anode composed of magnesium or a magnesium alloy, and a cathode stable to a voltage of up to 3.2 V relative to a magnesium reference via an external electrically conductive structure; and contacting the anode and cathode with a carboranyl magnesium electrolyte of at least one of the following:

    formula (I)

    formula (II)

    formula (III)

or any combination thereof, where i is an integer between 1 and 2 inclusive; j is an integer between 8 and 15 inclusive; p is an integer of j+1; X is a halide; and Y is an anion to provide charge neutrality. The carboranyl magnesium electrolyte as described can be employed alone or in combination with other electrolyte materials.

All ranges disclosed herein are inclusive of the endpoints, and the endpoints may be independently combined with each other. "Combination" is inclusive of blends, mixtures, alloys, reaction products, and the like. "Inclusive" denotes the endpoints of a range. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In an embodiment, provided herein is an electrochemical device that includes an anode composed of magnesium or a magnesium alloy; a cathode stable to a voltage of up to least 3.2 V relative to a magnesium reference electrode; and a carboranyl magnesium electrolyte of formula (I): $Mg(C_iB_jH_p)X$, formula (II): $Mg(C_iB_jH_p)Y$, formula (III): $Mg(C_iB_jH_p)_2$, or a combination including at least one of the foregoing, wherein; i is an integer between 1 and 2 inclusive, j is an integer between 8 and 15 inclusive, p is an integer of j+1; X is a halide, and Y is an anion, wherein (i) X is F, Cl⁻, or Br⁻, or I⁻, (ii) Y is $(BH_4)^-$, wherein (iii) the carboranyl magnesium electrolyte is soluble in an ethereal solvent, (iv) the ethereal solvent is selected from the group consisting of tetrahydrofuran, ethylene glycol dimethyl ether and bis 2-methoxy ethyl ether, wherein (v) the carboranyl magnesium electrolyte of formula (I) is obtained by contacting m-carborane represented by the formula $1,7\text{-}C_2B_{10}H_{12}$ with a magnesium-containing Grignard reagent represented by the formula RMgX, $R_2Mg$, or their combination in a molar ratio of 1:1 to 2:1, wherein X is as defined above, and R is an alkyl, aryl, or their combination, (vi) the carboranyl magnesium electrolyte of formula (II) is obtained by contacting lithium-carborane represented by the formula $LiC_iB_jH_p$, carborane of the formula $C_iB_jH_p$, or a combination thereof, with a $Mg(BH_4)_m$, wherein i, j, and p are as defined above, and m is an integer equal to 1 or 2, wherein (vii) the device exhibits a coulombic efficiency over 95%, wherein (viii) the cathode is an oxide, sulfide, or sulfur.

In another embodiment, provided herein is a method for preparing an electrochemical device, constructed by: connecting an anode comprising magnesium and a cathode stable to a voltage of up to 3.0 V relative to a magnesium reference via an external electrically conductive structure; and contacting the anode and cathode with a carboranyl magnesium electrolyte of formula (I): $Mg(C_iB_jH_p)X$, formula (II): $Mg(C_iB_jH_p)Y, Mg(C_iB_jH_p)_2$, or a combination comprising at least one of the foregoing wherein i is an integer between 1 and 2 inclusive, j is an integer between 8 and 15 inclusive, p is an integer of j+1, X is a halide, and Y is an anion wherein (ix) X is Cl⁻, or Br⁻, or I⁻, (x) Y is $(BH_4)^-$, wherein (xi) the carboranyl magnesium electrolyte is soluble in an ethereal solvent, (xii) the ethereal solvent is selected from the group consisting of tetrahydrofuran, ethylene glycol dimethyl ether and bis 2-methoxy ethyl ether, wherein (xiii) the carboranyl magnesium electrolyte of formula (I) is obtained by contacting m-carborane represented by the formula $1,7\text{-}C_2B_{10}H_{12}$ with a magnesium-containing Grignard reagent represented by the formula RMgX, $R_2Mg$, or their combination in a molar ratio of 1:1 to 2:1, wherein X is as defined above, and R is an alkyl, aryl, or their combination, (xiv) the carboranyl magnesium electrolyte of formula (II) is obtained by contacting lithium-carborane represented by the formula $LiC_iB_jH_p$, carborane of the formula $C_iB_jH_p$, or a combination thereof, with a $Mg(BH_4)_m$, wherein i, j, and p are as defined above, and m is an integer equal 1 or 2, wherein (xv) the device exhibits a Coulombic efficiency over 95%, wherein (xvi) the cathode is a sulfide and carboranyl magnesium electrolyte is $1\text{-}(1,7\text{-}C_2B_{10}H_{11})\text{—}MgCl$.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrochemical device, comprising: an anode comprising magnesium; a cathode; and a carboranyl magnesium electrolyte of:

$$Mg(C_iB_jH_p)X, \quad \text{Formula (I):}$$

$$Mg(C_iB_jH_p)Y, \quad \text{Formula (II):}$$

$$Mg(C_iB_jH_p)_2, \quad \text{Formula (III):}$$

or a combination thereof, wherein i is an integer between 1 and 2 inclusive, j is an integer between 8 and 15 inclusive, p is an integer of j+1, X is a halide, and Y is an anion.

2. The electrochemical device of claim 1, wherein X is $Cl^-$, or $Br^-$, or $I^-$.

3. The electrochemical device of claim 1, wherein Y is $(BH_4)^-$.

4. The electrochemical device of claim 1, wherein the carboranyl magnesium electrolyte is soluble in an ethereal solvent.

5. The electrochemical device of claim 4, wherein the ethereal solvent is selected from the group consisting of tetrahydrofuran, ethylene glycol dimethyl ether, and bis 2-methoxy ethyl ether.

6. The electrochemical device of claim 1, wherein the carboranyl magnesium electrolyte of formula (I) is obtained by contacting m-carborane represented by a formula $1,7\text{-}C_2B_{12}$ with:
a magnesium-containing Grignard reagent represented by a formula RMgX;
$R_2Mg$; or
a combination thereof;
in a molar ratio of 1:1 to 1:2, wherein X is a halide, and R is in each occurrence independently an alkyl or an aryl group.

7. The electrochemical device of claim 1, wherein the carboranyl magnesium electrolyte of formula (II) is obtained by contacting lithium-carborane represented by a formula $LiC_iB_jH_p$, carborane of a formula $C_iB_jH_p$, or a combination thereof, with $Mg(BH_4)_2$, wherein i, j, and p are as defined above, and m is an integer between 1 and 2 inclusive.

8. The electrochemical device of claim 1, wherein the device exhibits a Coulombic efficiency over 95%.

9. The electrochemical device of claim 1, wherein the cathode is a molybdenum sulfide and the carboranyl magnesium electrolyte is $1\text{-}(1,7\text{-}C_2B_{10}H_{11})\text{—}MgCl$.

10. The electrochemical device of claim 1, wherein the device is a rechargeable battery, a unit cell, a fuel cell, or a combination thereof.

11. A process for preparing an electrochemical device, comprising:
connecting an anode composed of magnesium or a magnesium alloy and a cathode via an external electrically conductive structure; and
contacting the anode and cathode with a carboranyl magnesium electrolyte of:

$$Mg(C_iB_jH_p)X, \quad \text{Formula (I):}$$

$$Mg(C_iB_jH_p)Y, \quad \text{Formula (II):}$$

$$Mg(C_iB_jH_p)_2, \quad \text{Formula (III):}$$

or a combination thereof, wherein i is an integer between 1 and 2 inclusive, j is an integer between 8 and 15 inclusive, n is an integer between 1 and 2 inclusive, p is an integer of j+1, X is a halide, and Y is an anion.

12. The process of claim 11, wherein X is $Cl^-$, or $Br^-$, or $I^-$.

13. The process of claim 11, wherein Y is $(BH_4)^-$.

14. The process of claim 11, wherein the carboranyl magnesium electrolyte is soluble in an ethereal solvent.

15. The process of claim 14, wherein the ethereal solvent is selected from the group consisting of tetrahydrofuran, ethylene glycol dimethyl ether, and bis 2-methoxy ethyl ether.

16. The process of claim 11, wherein the carboranyl magnesium electrolyte of formula (I) is obtained by contacting m-carborane represented by a formula $1,7\text{-}C_2B_{10}H_{12}$ with:
a magnesium-containing Grignard reagent represented by a formula RMgX;
$R_2Mg$; or
a combination thereof;
in a molar ratio of 1:1 to 1:2, wherein X is a halide, and R is in each occurrence independently an alkyl or an aryl.

17. The process of claim 11, wherein the carboranyl magnesium electrolyte of formula (II) is obtained by contacting Li-carborane represented by a formula $LiC_iB_jH_p$, carborane of a formula $C_iB_jH_p$, or a combination thereof, with a $Mg(BH_4)_2$,
wherein i, j, and p are as defined above, and m is an integer between 1 and 2 inclusive.

18. The process of claim 11, wherein the device exhibits a Coulombic efficiency over 95%.

19. The process of claim 11, wherein the cathode is sulfide, oxide or sulfur.

20. The process of claim 11, wherein the device is a rechargeable battery, a unit cell, a fuel cell, or a combination thereof.

* * * * *

UNITED STATES PATENT AND TRADEMARK OFFICE
CERTIFICATE OF CORRECTION

| | | |
|---|---|---|
| PATENT NO. | : 9,240,613 B2 | Page 1 of 1 |
| APPLICATION NO. | : 13/902797 | |
| DATED | : January 19, 2016 | |
| INVENTOR(S) | : Rana Mohtadi, Tyler J. Carter and Timothy S. Arthur | |

It is certified that error appears in the above-identified patent and that said Letters Patent is hereby corrected as shown below:

Claims
In Column 7, Lines 51-52, Claim 6, please delete "a formula 1,7-$C_2B_{12}$" and insert
--a formula 1,7-$C_2B_{10}H_{12}$--.

Signed and Sealed this
Thirty-first Day of May, 2016

Michelle K. Lee
*Director of the United States Patent and Trademark Office*